United States Patent
Caranoni et al.

(10) Patent No.: US 7,309,473 B2
(45) Date of Patent: Dec. 18, 2007

(54) METHOD FOR SULPHURIZING A $UO_2$ POWDER AND METHOD FOR MAKING NUCLEAR FUEL PELLETS BASED ON $UO_2$ OR MIXED OXIDE $(U,PU)O_2$ OXIDE WITH ADDED SULPHUR

(75) Inventors: Laurent Caranoni, Cabries (FR); Sylvie Dubois, Le Puy Sainte Reparade (FR)

(73) Assignees: Commissariat a l'Energic Atomique, Paris (FR); Compagnic Generale des Matieres Nucleaires, Velizy-Villacoublay (FR)

( * ) Notice: Subject to any disclaimer, the term of this patent is extended or adjusted under 35 U.S.C. 154(b) by 238 days.

(21) Appl. No.: 10/482,541

(22) PCT Filed: Jul. 1, 2002

(86) PCT No.: PCT/FR02/02285

§ 371 (c)(1),
(2), (4) Date: Dec. 24, 2003

(87) PCT Pub. No.: WO03/005374

PCT Pub. Date: Jan. 16, 2003

(65) Prior Publication Data

US 2004/0201002 A1   Oct. 14, 2004

(30) Foreign Application Priority Data

Jul. 4, 2001   (FR) .................................. 01 08870

(51) Int. Cl.
*C01G 43/025*   (2006.01)
(52) U.S. Cl. ........................... 423/3; 423/249; 423/261; 423/511
(58) Field of Classification Search ............ 423/3, 423/511, 561.1, 249, 261
See application file for complete search history.

(56) References Cited

U.S. PATENT DOCUMENTS 2,562,122 A * 7/1951 Powell ....................... 423/254

(Continued)

FOREIGN PATENT DOCUMENTS

FR    2 050 495 A    4/1971

(Continued)

OTHER PUBLICATIONS

International Search Report.*

(Continued)

*Primary Examiner*—Steven Bos
*Assistant Examiner*—Paul Wartalowicz
(74) *Attorney, Agent, or Firm*—Hutchison Law Group PLLC

(57) ABSTRACT

Sulphidation method for a $UO_2$ powder, in which said powder is sulfurated by bringing it into contact with a gaseous sulphidation agent.

Method for manufacturing nuclear fuel pellets based on uranium oxide, or mixed oxide of uranium and plutonium, from a load of totally or partially sulfurated $UO_2$ powder or $UO_2$ powder and $PuO_2$ powder, by lubrication, pelletizing and sintering, in which: the load of powder subjected to the lubrication, pelletizing and sintering is prepared by the following successive steps:
  sulphidation of a $UO_2$ powder by the above sulphidation method;
  optionally mixing, said sulfurated powder in a matrix comprising a $UO_2$ powder, or of a $UO_2$ powder and a $PuO_2$ powder;
  and, subjecting said load, formed from said sulfurated powder or said mixture, to lubrication, pelletizing and sintering operations.

17 Claims, 4 Drawing Sheets

U.S. PATENT DOCUMENTS

| | | | |
|---|---|---|---|
| 3,275,564 A * | 9/1966 | Pascard | 252/639 |
| 3,331,783 A * | 7/1967 | Braun et al. | 252/639 |
| 3,630,967 A * | 12/1971 | Nicklin et al. | 502/335 |
| 4,112,055 A * | 9/1978 | Artaud | 423/261 |
| 4,314,952 A * | 2/1982 | Zawidzki | 264/0.5 |
| 5,139,709 A * | 8/1992 | Huang et al. | 264/0.5 |
| 6,764,618 B1 * | 7/2004 | Vandergheynst et al. | 264/0.5 |

FOREIGN PATENT DOCUMENTS

| | | |
|---|---|---|
| FR | 2 424 231 A1 | 11/1979 |
| FR | 2 622 343 A | 4/1989 |
| FR | 2 738 076 A1 | 2/1997 |
| JP | 62 115398 A | 5/1987 |
| JP | 2000 193776 A | 7/2000 |

OTHER PUBLICATIONS

XP002199795, Database WPI, Section Ch, Week 198727, Derwent Publications Ltd., London, GB, JP 62 115398 A.

XP002199794, Database WPI, Section Ch, Week 200057, Derwent Publications Ltd., London, GB, JP 2000 193776 A.

Jean-Louis Nigon, et al., "Fabrication des combustibles au plutonium", *Techniques de I'Ingénieur—Génie Nucléaire*: BN 3630-1 to BN 3630-8.

* cited by examiner

METHOD FOR SULPHURIZING A $UO_2$ POWDER AND METHOD FOR MAKING NUCLEAR FUEL PELLETS BASED ON $UO_2$ OR MIXED OXIDE $(U,PU)O_2$ OXIDE WITH ADDED SULPHUR

The present invention concerns a sulphidation method for a $UO_2$ powder.

The present invention further concerns a method for manufacturing nuclear fuel pellets based on uranium dioxide or MOX type mixed oxides of uranium and plutonium, based on mixed oxide $(U, Pu)O_2$ that may be used in any type of reactor, particularly in water nuclear reactors and, in particular, in pressurised water reactors.

More precisely, the invention concerns a method that makes it possible to obtain, by addition of sulphur, sintered nuclear fuel pellets with improved properties with regard to the microstructure of said pellets with, in particular, an increase in the size of the particles of material, compared to the normal sizes.

Among the methods used until now for the manufacture of nuclear fuel pellets based on mixed oxide $(U, Pu)O_2$, the document "*Techniques de l'Ingénieur—Génie Nucléaire—B 3630-1 to 3630-10*" teaches a method in which one starts with a mixture of $UO_2$ and $PuO_2$ powders that one subjects to grinding, compacting and granulation followed by pelleting and sintering (FIG. 1).

In said method, called "cobroyage direct" (direct co-grinding), which is shown schematically in FIG. 1, one starts with $UO_2$ and $PuO_2$ powders, which one mixes in the desired proportions in order to obtain the desired level of plutonium, taking account of the isotopic characteristics and the metal-oxide ratios of the different batches of powders used. Consequently, in the first dosage step, one mixes the desired quantities of $UO_2$ and $PuO_2$ powders in order to obtain the specified plutonium level. One then carries out the second step, which is a grinding step in cylindrical jars containing hard milling balls to break down the powder agglomerates, thoroughly mixing the constituents and fragmenting the particles of powder by thus increasing their suitability to sintering. One then carries out the third step of granulation, which consists in compacting the powders obtained previously, then splitting up the compacts obtained in a crusher and sieving them in order to obtain the desired particle size and transform the powder into a denser and roughly spherical product. After this operation, one carries out the lubrication step which consists in adding a lubricant such as zinc or calcium stearate to the granules. One then carries out the pelletisation by pressing the granules at constant pressure in alternating or rotating presses, then one proceeds to sintering in order to increase the density of the pellets and obtain the final characteristics.

Said method has the major disadvantage of providing nuclear fuel pellets in which the internal structure does not confer them with satisfactory suitability for precision grinding due to fissuring and appearance defects.

Furthermore, the sintered pellets obtained in this manner, although they meet the required specifications, still pose certain problems in subsequently obtaining the complete dissolution of the plutonium during reprocessing operations for irradiated pellets. Indeed, in a nuclear reactor, said pellets are subjected to high temperatures, which leads to the production of refractory plutonium oxide which is difficult to dissolve.

Patent FR-A-2 622 343 describes a method called "procédéde double cobroyage" (double co-grinding method) which constitutes an evolution of the previous method and which is shown schematically in FIG. 2, and in which one subjects to pelletising, then sintering, a load of $UO_2$ and $PuO_2$ powders comprising particles with particle sizes less than or equal to 250 μm, which is prepared in the following manner: dosage of a first mixture of powders (masterbatch) with a level of plutonium higher than the specified level and composed of $UO_2$, $PuO_2$ and, if appropriate, recycled powders which undergo a first grinding, then dosage of a second mixture of powder by addition of $UO_2$ and, if necessary, recycled powders. Said second mixture is subjected to a grinding for a limited period and sieving through a sieve with openings with dimensions less than or equal to 250 μm.

In a variant of said method, the second grinding is replaced by a simple mixing.

However, the pellets obtain either by the direct co-grinding method or the double co-grinding method, which meet the required specifications, do not have optimum characteristics vis-á-vis the release of fission gases, at high burn up rates.

However, it has been shown, for example in document FR-A-2 424 231, that the microstructure of the sintered pellets and in particular the size of the particles has a major effect on the exit velocity of the fission products, in particular gaseous products, during the irradiation of the fuels. Indeed, a particle size between 20 and 40 μm (microns) appears to favour the retention of fission gases while at the same time conserving in the material satisfactory flow characteristics.

It has also been taught by patent GB-A-2 019 824, corresponding to patent FR-A-2 424 231, that it is possible to prepare sintered uranium dioxide pellets comprising large particles. In the first step of the method, one reacts a uranyl nitrate with a source of sulphur in liquid form, only sulphuric acid being cited, at a high temperature to form a uranium trioxide containing sulphur. The $UO_2$ powder, obtained by precipitation and thermal treatment of the ammonium diuranate, makes it possible to form fuel pellets with particle sizes ranging from 50 to 1000 μm. The levels of elementary sulphur in the $UO_2$ may reach 300 ppm by weight.

In said method, the introduction of sulphur is achieved by liquid route, before the preparation of the $UO_2$ powder. Although this document highlights the influence of a sulfurated compound on the crystalline growth, the fact of carrying out the incorporation of sulphur in liquid form cannot suit the manufacture of MOX fuel, given the problems of criticality.

Moreover, the introduction of sulphur at a very upstream stage, that of preparing the $UO_2$ precursor, multiplies the number of steps where the sulphur is present, thus increasing the risks of pollution, corrosion, etc.

Japanese patent JP-A-62 115 398 describes the preparation of a nuclear fuel, in which one incorporates sulphur in the powder state in a powder of a single oxide chosen from among $UO_2$, $ThO_2$, $PuO_2$ and $Gd_2O_3$.

The operation is carried out by mixing the powder with 0.1% to 1% by weight of pure sulphur, or a sulfurated organic compound such as ammonium sulphate, napththylamine sulphonate or xylene sulphonic acid.

The tablets obtained are previously heated up to the melting point of the sulfurated additive, then sintered at 1500-1800° C. for 1 to 10 hours in a $H_2$ reducing atmosphere. No precise particle size is given in this document.

In this document, it is necessary to carry out a fusion step of the sulfurated additives, prior to the sintering operation.

The sulfurated organic compound has, it seems, the purpose of improving the retention of fission gases and the interaction between the pellet and the sheath.

The pellet obtained has a heterogeneous structure with particles of small diameter on the surface and large particles in the core of the pellet.

Document FR-A-2 738 076 describes a method for manufacturing MOX fuel pellets by incorporation in the initial powder of an organic wax of composition $C_{17}H_{37}NO_3S$, normally used for its anti-agglomeration properties. The mixture generally containing 0.6% by weight of additive is achieved by co-grinding, then forming and sintering. The sizes of the particles observed in the final pellets are between 20 and 40 µm, in other words they are higher, by a factor of 2 to 5, than the normal sizes. The authors indicate that said wax, which has a molar weight around 10 times higher than that of pure sulphur, makes it possible to intimately mix small quantities of sulphur.

There is a need for a method that makes it possible to obtain a fuel based on mixed oxide or uranium dioxide with large particle size which, in addition, meets all of the required specifications for these pellets.

There is also a need for a method for manufacturing pellets that does not have the limitations, defaults or disadvantages of the methods of the prior art, in which one uses a sulfurated additive in liquid or solid form.

The aim of the present invention is, in particular, to provide a sulphidation method and a method for manufacturing nuclear fuel pellets including this sulphidation treatment, which makes it possible to satisfy, among other things, the requirements defined above.

This aim and others are attained according to the invention by a sulphidation method of a $UO_2$ powder, in which said powder is sulfurated by bringing it into contact with a gaseous sulphidation agent.

Consequently, in a fundamental manner, the present invention introduces the production, by gaseous route, of sulfurated species in the $UO_2$ or $UO_2$ and, $PuO_2$ powder.

The sulphidation agent may advantageously be chosen from among carbon sulphide $CS_2$ and hydrogen sulphide $H_2S$.

The preferred sulphidation agent is hydrogen sulphide $H_2S$.

Advantageously, the gaseous sulphidation agent is mixed with hydrogen and an inert gas, such as argon or nitrogen.

Advantageously, the gaseous mixture generally comprises, by volume, 2.5% to 25% of sulphidation agent, such as $H_2S$, from 37.5% to 72.5% of hydrogen, and from 60% to 2.5% of an inert gas such as argon.

The total flow rate of gas, of the mixture of gas used for the sulphidation, is generally from 1 to 500 ml/min, for example close to 200 ml/min.

Bringing into contact the gaseous sulphidation agent is generally carried out at a temperature from 800° C. to 1200° C., and preferably from 970° C. to 980° C. for a period time of 1 to 11 hours.

This preferred temperature range is chosen for kinetic reasons, but lower temperatures would be suitable.

Said treatment leads to the production of powder containing sulphur in the $UO_2$ structure or in adsorption, as well as in the form of crystalline phases, particularly UOS.

The sulphidation method according to the invention differs fundamentally from the sulphidation methods of the prior art by the fact that the sulfurated species—which, in the method for manufacturing pellets is favourable to the growth of particles—is introduced by a gaseous route method during which the $UO_2$ powder is brought into contact with the sulphidation agent, such as $H_2S$, which is in the gaseous state.

In other words, the sulphidation of the uranium dioxide takes place under gaseous flow, for example hydrogen sulphide, and the sulphidation agent is therefore introduced neither in liquid form nor in solid form.

The mode of sulphidation by gaseous route with a sulfurated agent in gaseous state, such as $H_2S$, is neither described nor suggested in documents of the prior art.

The method according to the invention, in which the sulfurated additive or sulphidation agent is used in the gaseous form is a major security factor and makes it possible to avoid the risks of criticality linked to the addition of additive by liquid route, in particular, in the manufacture of $UO_2$-$PuO_2$ mixtures. Indeed, hydrogenated products, such as water, have a moderating effect, in other words they can favour a non-controlled chain fission reaction (criticality accident).

Another difference resides in the stage in which the sulphidation occurs during the preparation of the $UO_2$ powder for the method by liquid route, or during the manufacture of fuel for the method of this invention.

Compared to methods using the sulfurated additive by solid route, the advantages of using an agent in gaseous state are better control of the average sulphur level, in particular of the low levels, thanks to the adaptation of the thermal cycle (length, $H_2S$ concentration, temperature) and to the better dispersion of the sulphur throughout the powder.

The sulfurated powder obtained has a well defined sulphur content, which may be easily adjusted.

The level of sulphur in the final powder is, in particular, a function of the thermodynamic and kinetic conditions of the sulphidation which may be easily adjusted in order to attain the desired level. Generally, the level of sulphur in the $UO_2$ powder is from 100 ppm to several %.

The invention further concerns a method for manufacturing nuclear fuel pellets based on uranium oxide, or mixed oxide of uranium and plutonium, from a load of totally or partially sulfurated $UO_2$ powder or $UO_2$ powder and $PuO_2$ powder, by lubrication, pelletizing and sintering, in which the load of powder subjected to said lubrication, pelletizing and sintering is prepared by the following successive steps:

sulphidation of a $UO_2$ powder by the method described above;

optimaly mixing said sulfurated powder in a matrix consisting of a $UO_2$ powder, or of a $UO_2$ powder and a $PuO_2$ powder;

and, subjecting said load, formed from said sulfurated powder or said mixture, to lubrication, pelletizing and sintering operations.

This manufacturing method has all the advantages inherent in the use, during the method for sulphidation of the $UO_2$ powder and, in accordance with the invention, of a gaseous sulphidation agent.

Indeed, due to the use of a gaseous sulphidation agent for the sulphidation of the $UO_2$ powder, on thus obtains a sulfurated powder in which the sintering, alone, or incorporated in a matrix of $UO_2$ or $UO_2$ and $PuO_2$, leads in a surprising manner to a microstructure with large grains in the final pellets.

Without wishing to be linked to any theory, the invention uses the temporary presence of sulphur or uranium oxysulphide in the $UO_2$ or MOX structure during the sintering.

The sulphidation of the uranium dioxide according to the invention leads to, following sintering, to pellets that meet all the necessary requirements therefor.

In particular, the pellets prepared by the method according to the invention with sulphidation of the $UO_2$ powder by gaseous route have, for example, a microstructure generally characterised by a size gradient between the edge and the centre, and the presence of large grains at the core of the pellets, a density of around 97 to 98% of the theoretical density, and finally an extremely low level of residual sulphur, generally less than 20 ppm, or even 10 ppm.

Indeed, thanks to the incorporation of the sulphur by gaseous route, according to the invention, the quantity of species resulting from the sulphidation to be eliminated during sintering is limited to sulphur dioxide $SO_2$, unlike the incorporation method by solid route, which introduces organic species.

Said virtually complete elimination of the sulphur has a beneficial effect on the final properties of the pellets.

The sulfurated $UO_2$ powder is preferably incorporated into the matrix of $UO_2$ or $UO_2$ and $PuO_2$ by simple mixing, in an extremely simple manner, and consequently one easily obtains a perfectly homogeneous load of powder.

The level of sulphur in the load subjected to the lubrication, pelletizing and sintering operations is generally from 50 ppm to 1%, and preferably from 100 ppm to 1000 ppm (0.1%).

Preferably, all or part of the $UO_2$ powder or mixture of $UO_2$ and $PuO_2$ powders constituting the matrix has been, prior to lubrication, subjected to a grinding operation, preferably in a ball mill.

All or part of the $UO_2$ powder used in the constitution of the load may be a powder that has been subjected, prior to grinding, to a reducing treatment, for example under a hydrogenated argon atmosphere, so that it has an O/U atomic ratio of 2.00 to 2.04, for example of 2.04.

A pore forming agent may be incorporated in the load of powders during lubrication.

The pelletizing may in particular be carried out by means of a hydraulic press.

Advantageously, the sintering is carried out at a temperature, for example, between 1650° C. and 1750° C., preferably close 1700° C., in a hydrogenated atmosphere, for example hydrogenated argon. Preferably, the sintering atmosphere is humidified.

Finally, one may subject the sintered pellets to dry precision grinding.

Other characteristics and advantages of the invention will become clearer on reading the following description, given by way of illustration and in nowise limitative, and by referring to the appended drawings, in which:

FIGS. 1 and 2 already described are block diagrams showing the steps of conventionnal methods for manufacturing pellets, according to the prior art;

Figure 1:
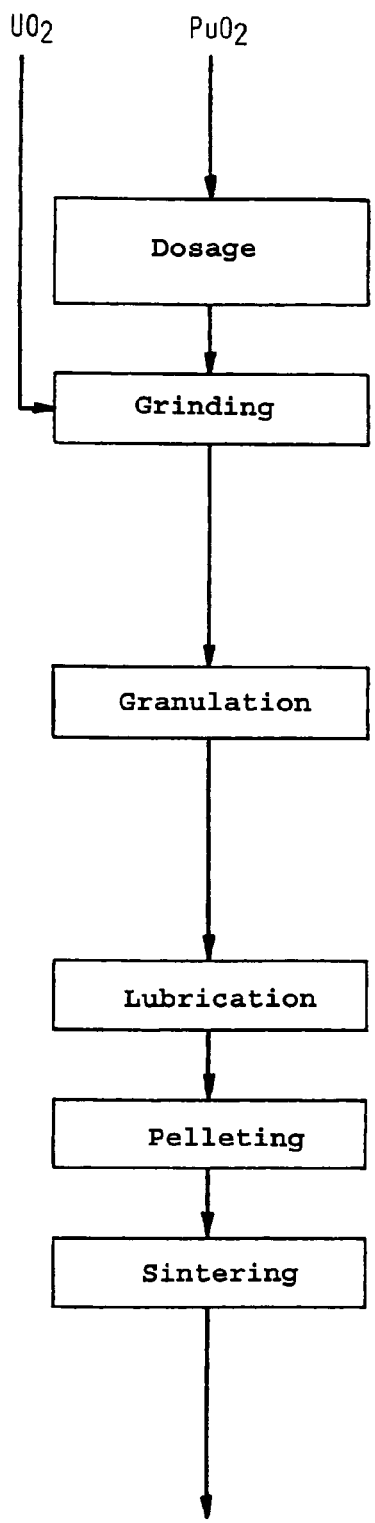
Figure 2:
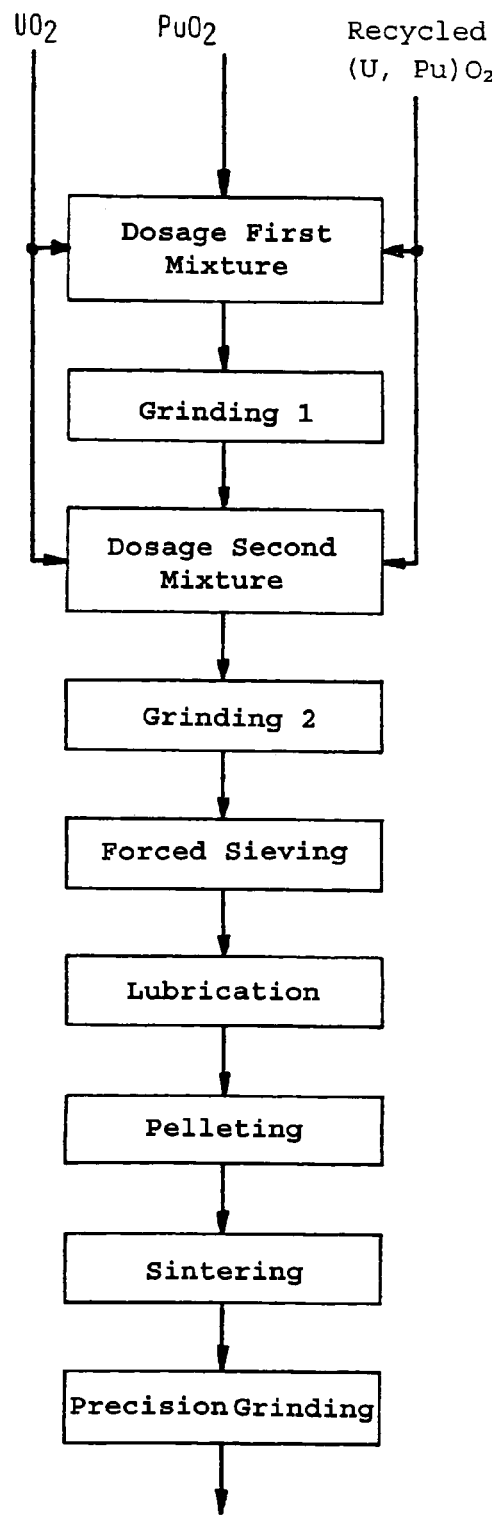

The sulphidation method, according to the invention, of a $UO_2$ powder consists in bringing into contact said powder with a gaseous sulphidation agent.

The uranium dioxide powder generally has an atomic ratio (O/U) of 2.0 to 2.4.

If the uranium dioxide powder that one has available has too high a stoichiometric ratio, in other words if it has a higher O/U ratio, for example 2.04 to 2.25, one subjects it to a reduction treatment, generally under a hydrogenated argon atmosphere, at a temperature for example from 600° C. to 1000° C. that can bring back the O/U atomic ratio into the suitable range defined above.

The sulphidation agent is, according to the invention, a gaseous sulphidation agent under the treatment conditions.

The sulphidation agent is generally chosen from among carbon sulphide $CS_2$ and hydrogen sulphide $H_2S$.

The preferred sulphidation agent is hydrogen sulphide $H_2S$ because $H_2S$ is gaseous at ambient temperature, unlike $CS_2$ which is liquid.

Preferably, to carry out the treatment, the sulphidation agent is mixed with hydrogen and/or an inert gas such as argon or nitrogen.

The proportion, by volume, of the sulphidation agent is generally from 1% to 100% by volume of the gaseous mixture.

In the case of a gaseous mixture composed of hydrogen, an inert gas such as argon, and $H_2S$ as sulphidation agent, the composition by volume of the mixture is generally from 2.5 to 25% of $H_2S$, from 37.5% to 72.5% of $H_2$ and from 60% to 2.5% of argon.

The sulphidation operation is, for example, carried out in a tubular quartz reactor heated by means of intensity regulated resistive windings, in which the powder to be sulfurated is put.

The reactor is equipped with regulation means making it possible to circulate a total flow rate of gas of between 1 and 500 ml/minute, for example 200 ml/min, as well as, if necessary, means of modifying the proportions of each of the gases in the mixture.

The sulphidation is generally carried out at a temperature of 800° C. to 1200° C. Preferably, the temperature is from 970° C. to 980° C. It has been observed that in kinetic terms, it is particularly interesting to operate in said temperature range but lower temperatures would also be suitable, for example from 800° C. to 950° C.

The treatment time is generally from 1 to 11 hours, for example 2 h 30 min.

The sulphidation treatment leads to the production of a powder containing variable levels of sulphur, which depends on the thermodynamic and kinetic conditions of sulphidation. The quantity of sulphur may, according to the invention, be easily adjusted, during the treatment, carried out preferably under a controlled carrier gas by acting on the various parameters governing the sulphidation, such as the temperature, flow rate and the composition of the gas flow and the duration of the treatment.

The concentration or level of sulphur in the final sulfurated powder is variable, but is generally from 100 ppm to 12% of sulphur.

The sulphur is present in the $UO_2$ structure or in adsorption, but it may appear in the form of crystalline phases such as UOS, US or $US_2$.

Since the proportion and the nature of the phases are linked to the level of sulphur, during the sulphidation, one seeks to avoid the formation of US and $US_2$, by aiming for low, but sufficient, sulphur concentrations in order to obtain the desired effect by adjusting the sulphidation parameters mentioned above.

The invention further concerns a method for manufacturing nuclear fuel pellets based on uranium oxide or mixed oxide of uranium and plutonium (MOX), from a totally or partially sulfurated $UO_2$ powder or a $UO_2$ and $PuO_2$ powder, by a series of steps essentially comprising a pelletizing step and a sintering step.

Said method for preparing nuclear fuel pellets is characterised by the fact that all or part of said $UO_2$ powder used in the method for manufacturing pellets is sulfurated beforehand by the sulphidation method as detailed above.

The phrase "all or part of the $UO_2$ powder is sulfurated beforehand" is taken to mean that the sulfurated powder may either be pelletized and sintered alone, in other words constitute the whole of the load of powder subjected to the pelleting then sintering, or be introduced in a matrix of $UO_2$, or of a mixture of $UO_2$ and $PuO_2$.

It should be noted that the uranium dioxide powder used in the composition of the matrix is, in the present description, generally defined by the formula $UO_2$ in order to simplify matters, independently of any stoichiometric discrepancy.

Nevertheless, said uranium dioxide powder generally exhibits an over stoichiometry and consequently has in fact the formula $UO_{2+x}$, where x=0 to 0.25.

It will be seen later that, preferably, the stoichiometry of the uranium dioxide must be low, for example where x is 0 to 0.04 and that, if necessary, one subjects the crude $UO_2$ powder to a reducing treatment in order to bring the stoichiometry into this range.

The incorporation in said matrix is carried out in the solid state, preferably by simple mixing, generally in a gentle mixer, for example an oscillating/rotating movement type mixer at a rotation speed generally from 15 to 90 rpm and for a period of time of 15 to 60 minutes.

Any other type of mixer may be used, particularly a conical screw mixer or a shovel mixer.

Said mixing step consists in fact in a simple mechanical mixing which turns out to be sufficient to obtain, after pelleting and sintering, fuel pellets that meet the necessary specifications and which have all of the improved properties characteristic of the pellets of the invention. The total or partial sulphidation of the $UO_2$ powder improves, particularly in the case of the preparation of mixed oxide pellets, the homogeneity of distribution of the plutonium within the mixture.

Since the sulphidation conserves the morphology of the $UO_2$ granules, all of the load intended for pelleting remains flowable, facilitating the filling of the matrices during the subsequent pressing step.

The mass percentage of sulfurated $UO_2$ powder compared to the whole of the mixture of powders depends on the nature of the sulfurated powder which may comprise UOS and/or US and/or $US_2$.

Consequently, in the case of a sulfurated $UO_2$ powder, consisting essentially a monophase of UOS, the level of sulfurated powder is generally from 0.1 to 10% by weight.

In all cases, the mixture is formed in such a way that the overall concentration by weight in elementary sulphur is generally from 270 ppm to 1%, in the final load (with a matrix of $UO_2$ or $UO_2 + PuO_2$). However, it is also possible to aim for lower levels, for example from 100 ppm to 270 ppm.

In the case of a matrix consisting solely of uranium dioxide powder $UO_2$, one uses for the matrix a $UO_2$ powder which is analogous to that used above as base product for the sulphidation.

The uranium powder incorporated into the matrix generally has an atomic ratio (O/U) of 2.0 to 2.04.

If the uranium dioxide powder that one has available has a too high stoichiometry, in other words with a higher O/U ratio, for example from 2.04 to 2.25, one may subject it to a reducing treatment in order to maintain the O/U atomic ratio in the suitable range defined above.

All or part of the $UO_2$ matrix may also advantageously consist of a $UO_2$ powder ground before the incorporation of the sulfurated uranium dioxide powder.

One then preferably uses as base powder a $UO_2$ powder with a high O/U ratio, for example from 2.04 to 2.25 and one subjects it to a grinding step in order to obtain a finer powder and to maintain the O/U ratio from 2.04 to 2.25.

Said grinding operation, known to those skilled in the art, is generally carried out in a ball mill ("broyeur àboulets") with balls of a hard material or in any other type of grinder, for example a ball grinder ("broyeur àbilles") (grinding by attrition) or a gas jet grinder.

In the case of a matrix consisting of a mixture of $UO_2$ and $PuO_2$ powders, all or part of the uranium dioxide powder may be a powder that originally had too high a stoichiometry and which has been subjected to a reducing treatment in order to bring the O/U atomic ratio into the suitable range defined above.

In addition, all or part of the mixture of $UO_2$ and $PuO_2$ powder forming the matrix may have undergone beforehand, and in an advantageous manner, a grinding under the conditions already described above for a matrix consisting solely of $UO_2$.

For example, part of the $UO_2$ powder mixed with the sulfurated $UO_2$ powder could be a $UO_2$ powder reduced under the conditions detailed above, whereas the matrix could consist of a mixture of $UO_2$ and $PuO_2$ powders that have been subjected to a grinding.

The $PuO_2$ powders may, if necessary, be calcinated before being introduced into the mixture.

The sulfurated and non-sulfurated $UO_2$ powders on the one hand, and the $PO_2$ powder, may be very precisely dosed in order to obtain, in the mixture subjected to pelleting, the exact specified level of plutonium in the final mixed oxide pellets. Said plutonium concentration is generally from 2 to 15% by weight.

The $UO_2 + PuO_2$ matrix may be prepared, for example, as in document FR-A-2 738 076, and in particular as in steps a) to e) of claim 1 or a) and b) of claim 2.

The following steps of lubrication, with the addition if necessary of a pore forming agent, forming by pressing or pelletizing, sintering and, if necessary, precision grinding are carried out in a known manner such as, for example, in the prior patents described above.

The lubrication step may be carried out using, for example, as lubricant zinc or calcium stearate.

In the case where the density of the sintered pellets obtained from this load of powders is too high compared to the required specifications, one adds a pore forming agent to the powder, for example azodicarbonamide, at the same time as the lubricant.

The step of pelletizing or forming by pressing may be carried out, for example, using a hydraulic press.

At this stage, before sintering, the density of the pellets is generally from 50 to 60% of the theoretical density, which is 10.96 to 11.46.

The sintering step is carried as quickly as possible, after the pelleting, in such a way as to limit the effects of radiolysis of the lubricant and, if appropriate, the pore forming agent on the crude pellets.

The sintering is generally carried out, as in the prior art, at a temperature generally from 1650° C. to 1750° C., preferably close to 1700° C., in a reducing gas atmosphere, for example in a hydrogen—argon mixture.

Preferably, the sintering atmosphere is humidified.

The invention profitably employs the temporary presence of sulphur or uranium oxysulphide in the $UO_2$ structure or MOX, during the sintering. The degradation of the sulphur, by local humidity or by that in the sintering atmosphere at low temperatures, goes through the formation of gaseous sulphur oxide which is eliminated easily and simultaneously by the formation of $UO_2$.

Figure 3:
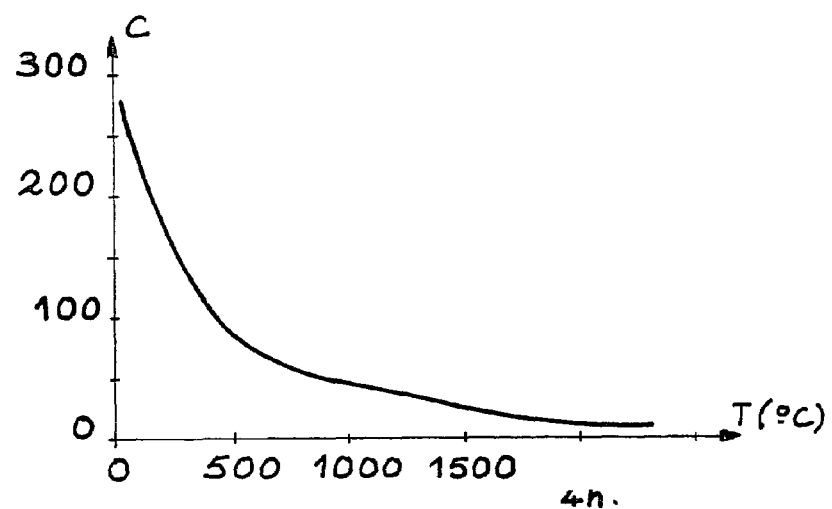
FIG. 3 is a graph showing the change in concentration C of sulphur (in ppm) as a function of the sintering temperature T, expressed in ° C.

It should be noted that in FIG. 3 the sulphur concentration (in ppm) drops with the sintering temperature.

It goes from 270 ppm in the initial sintering powder ("0° C.") to around 10 ppm at 1700° C. after a levelling out period of 4 hours.

After sintering, one may subject the pellets to a precision grinding which may be carried out in a centreless grinding machine under dry conditions, in order to obtain pellets that meet the diameter specification.

Figure 4:
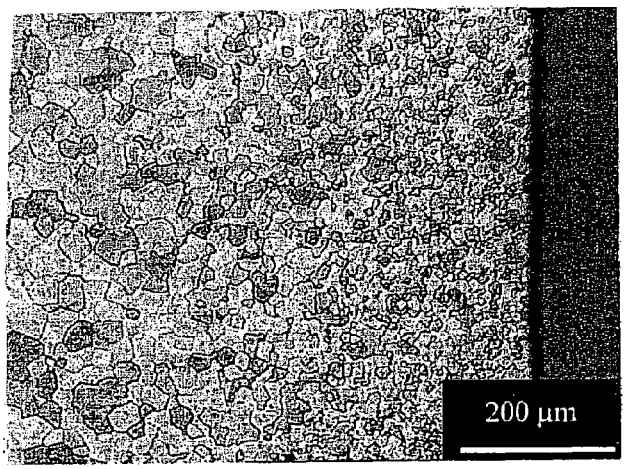
FIG. 4 is a microstructural observation, or micrograph, of a sintered pellet from a sulfurated mixture containing 270 ppm of S, consisting of $UO_2$ and UOS. The line shown represents 200 µm.
Figure 5:
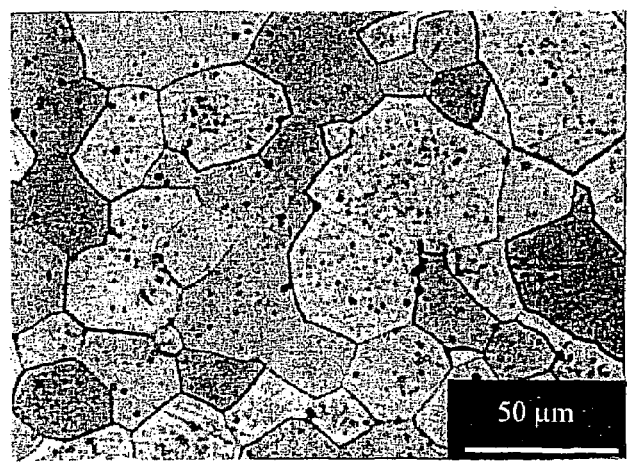
FIG. 5 is a microstructural observation, or micrograph, of a sintered pellet from a sulfurated mixture containing 270 ppm of S, consisting of $UO_2$ and UOS. The line shown represents 50 µm.
Figure 6:
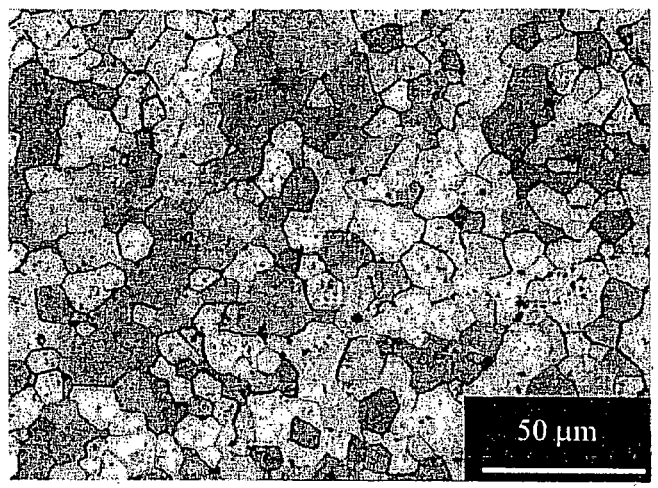
FIG. 6 is a microstructural observation, or micrograph, of a sintered pellet from a $UO_2$ powder without sulphur. The line shown represents 50 µm.

The pellets obtained by the method according to the invention generally have the following characteristics:

- a density of around 97 to 98% of the theoretical density,
- a particle size gradient between the outer zone around 50 to 300 μm thick, and the core of the sintered pellet (FIG. 4). The grain size is measured on micrographs obtained by optical microscopy of the pellets, which have been previously sectioned, polished and which have undergone a chemical attack. This type of microstructure favours the reduction of mechanical interactions between the pellets and the sheathes in which the pellets are then introduced. At the edge of the pellets, the grains have an average size of around 10 microns. The principal zone has large grains,
- a high grain size, at the core of the pellets, in which the average value attains 25 to 30 μm (FIG. 5) compared to 8 to 10 μam for a sulphur-free fuel (FIG. 6). Some grains may measure several tens of microns (80 μm) or even hundreds of microns (up to 600 μm),
- good homogeneity of the grain size distribution,
- a residual sulphur level of 10 ppm by weight, to 20 ppm for pellets with a higher initial concentration of sulphur. Most of the sulphur is no longer in the structure before the start of the sealing of the porosity of the fuel, i.e. around 1100° C. (FIG. 4),
- the addition of water, either via the sintering atmosphere, or by reducing the over-stoichiometry of the matrices, in particular of $UO_{2+x}$, makes it possible to oxidise the sulphur present into $SO_2$.

The following examples, given by way of illustration and in nowise limitative, illustrate the sulphidation method as well as the method for manufacturing nuclear fuel pellets according to the invention.

The comparative examples illustrate the preparation of pellets from powders that have not been subjected to the sulphidation treatment by gaseous route according to the invention.

EXAMPLE 1 a) Sulphidation Treatment

Firstly, one subjects a uranium dioxide powder to a thermal treatment at 970° C. for 2 h 30 min under a gas flow with a composition, by volume, of 5% $H_2S$-35% $H_2$-60% Ar.

Following this treatment, the powder consists of a $UO_2$ phase and traces of a UOS phase. Chemical assaying of elementary sulphur in said powder indicates an overall average level of 1900 ppm by weight of sulphur (equivalent to 1.7% by weight of UOS in the powder).

b) Preparation of the Pellets

The powder is then formed using a hydraulic press under a pressure of 300 MPa. During this step, the matrix is lubricated by means of zinc stearate. The crude tablets or pellets have cylindrical geometry characterised by a height and a diameter close to 6 mm.

The pellets obtained are then subjected to sintering at 1700° C. under argon atmosphere containing 5% hydrogen and humidified with 1000 ppm water.

Figure 7:
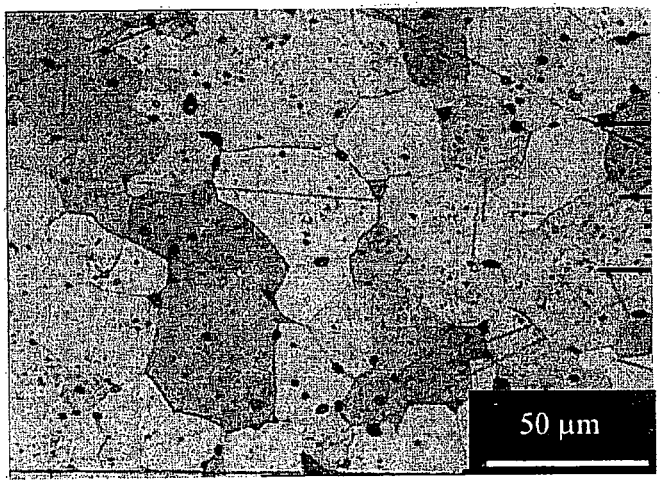
FIG. 7 is a microstructural observation, or micrograph, of a sintered pellet from a sulfurated $UO_2$ powder containing 1900 ppm of S. The line shown represents 50 µm.

The sintered pellets are characterised by:

- a grain size gradient between the edge and the centre of the pellets;
- an average grain size at the core of the pellets of 25 μm and at the edge of 10 μm. This microstructure is shown in FIG. 7. The size of the large grains may attain 60 μm.
- a residual sulphur level of between 10 and 20 ppm by weight.

EXAMPLE 1A (COMPARISON)

One prepares the pellets in the same way as in example 1, but from a uranium dioxide powder that has not been subjected to sulphidation treatment.

The powder pellets thus prepared, which have not undergone gaseous sulphidation treatment, have a significantly smaller average grain size, 11 μm, as illustrated in FIG. 6.

EXAMPLE 2 a) Sulphidation Treatment

One subjects a uranium dioxide powder to a thermal treatment at 980° C. for 11 hours under a gas flow with a composition, by volume, of 25% $H_2S$-72.5% $H_2$-2.5% Ar. Following this treatment, the powder comprises a monophase UOS. The theoretical concentration of elemental sulphur is 11.2%.

b) Preparation of the Powder to be Pelletized

One subjects 402 g of uranium dioxide powder, with an O/U atomic ratio of 2.18, to a grinding in a ball jar mill for 3 hours.

Following said grinding, the $UO_{2+x}$ powder is mixed with 0.24% by weight of UOS obtained previously in a Turbula® type mixture at 62 rpm for 45 minutes. The overall concentration of elementary sulphur in said mixture is 270 ppm by weight.

c) Preparation of the Pellets

The mixture is formed using a hydraulic press under a pressure of 300 MPa. During this step, the matrix is lubricated by means of zinc stearate. The crude tablets have cylindrical geometry characterised by a height and a diameter close to 6 mm.

The pellets obtained are subjected to sintering at 1700° C. under argon atmosphere containing 5% hydrogen and humidified with 1000 ppm water.

The sintered pellets are characterised by:
- a grain (particle) size gradient between the edge and the centre of the pellets;
- an average grain size at the core of the pellets of 27 μm and at the edge of 10 μm. The size of the large particles may attain 80 μm. Said microstructure is shown in FIG. 5.
- a residual sulphur level of 10 ppm.

EXAMPLE 3 a) Preparation of the Powder to be Pelletized

One subjects a uranium dioxide powder, with an O/U atomic ratio of 2.18 to a reducing treatment under hydrogenated argon atmosphere, bringing the final O/U atomic ratio to 2.04.

Following said treatment, the $UO_{2.04}$ powder is mixed with the powder from the sulphidation treatment of example 1, with an elementary sulphur concentration of 1900 ppm by weight, in such a way that the final mixer has an elementary sulphur concentration of 270 ppm by weight. The mixing step is carried out in a Turbula® type mixer at 62 rpm for 45 minutes. The load comprises 85.8% by weight of uranium dioxide powder and 14.2% by weight of sulfurated powder.

b) Preparation of the Pellets

The mixture is formed using a hydraulic press under a pressure of 300 MPa. During this step, the matrix is lubricated by means of zinc stearate. The crude tablets have cylindrical geometry characterised by a height and a diameter close to 6 mm.

The pellets obtained are subjected to sintering at 1700° C. under argon atmosphere containing 5% hydrogen and humidified with 1000 ppm water.

Figure 8:
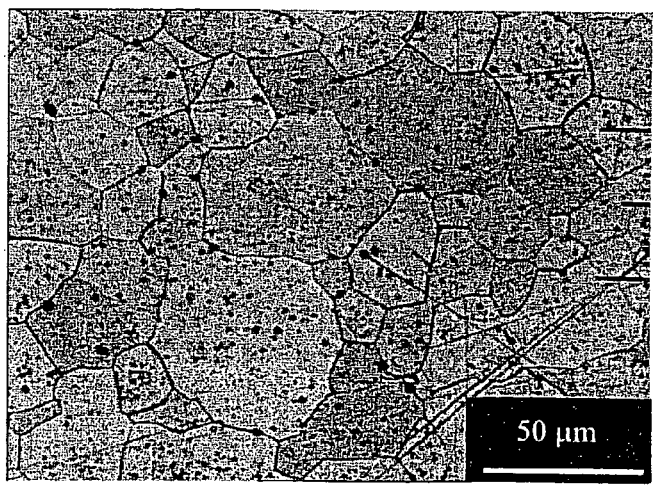
FIG. 8 is a microstructural observation, or micrograph, of a sintered pellet from a sulfurated mixture containing 270 ppm of S, consisting of $UO_2$ and a sulfurated powder containing 1900 ppm of S. The line shown represents 50 µm.

The sintered pellets are characterised by an average grain size at the centre of the pellets of 27 μm (FIG. 8) and at the edge of 10 μm. The size of the large grains may attain 80 μm.

In addition to a microstructure with a size gradient between the edge and the centre, in addition to the presence of large grains at the core of the pellets, the method also makes it possible to obtain pellets with densities of around 97% to 98% of the theoretical density (10.96).

This final observation also applies to examples 1 and 2.

EXAMPLE 4

Illustration with $PuO_2$ a) Preparation of the Powder to be Pelletized

One subjects 367 g of a mixture consisting of 327 g of a uranium dioxide powder (O/U=2.18) and 40 g of a plutonium dioxide powder to a grinding in a ball mill for 2 hours.

Following said grinding, the mixture of the two uranium and plutonium oxides is sieved through a sieve with openings ≦250 μm, then mixed with the powder from the sulphidation treatment of example 2, with a concentration of elementary sulphur of 11.2% by weight, in such a way that the final mixture has a concentration of elementary sulphur of 270 ppm by weight. The mixing step is carried out in a mixer with a simple rotating movement at 60 rpm for 60 minutes. The load consists of 99.76% by weight of the mixture of two oxides of uranium and plutonium and 0.24% by weight of UOS obtained according to example 2.

b) Preparation of the Pellets

The mixture is formed using a hydraulic press under a pressure of 300 MPa. During this step, the matrix is lubricated by means of zinc stearate. The crude tablets have cylindrical geometry characterised by a height and a diameter close to 6 mm.

The pellets obtained are then subjected to sintering at 1700° C. under argon atmosphere containing 5% hydrogen and humidified with 1000 ppm water.

Figure 9:
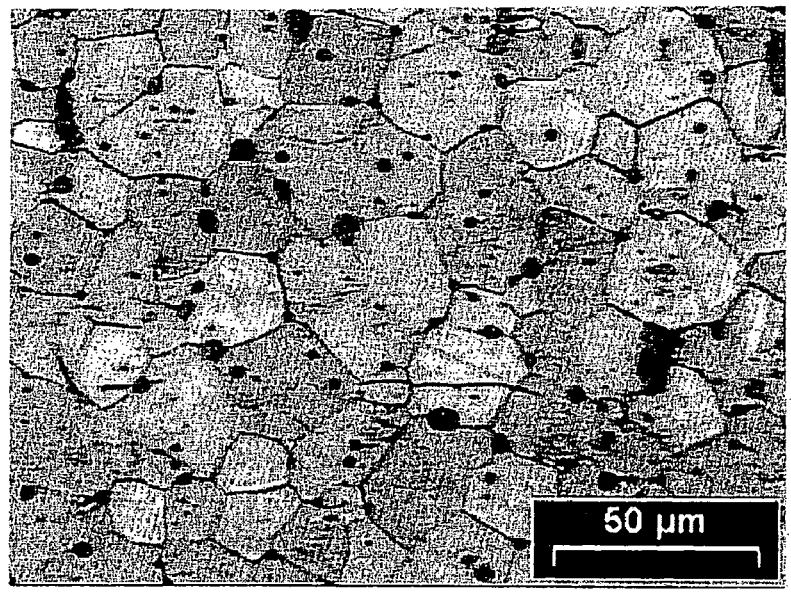
FIG. 9 is a microstructural observation, or micrograph, of a sintered pellet from a sulfurated mixture of $UO_2$ and $PuO_2$ containing 270 ppm of S, consisting of $UO_2$, $PuO_2$ and UOS. The line shown represents 50 µm.

The sintered pellets are characterised by an average particle size at the centre of the grains of 20 μm (FIG. 9) and at the edge of around 5 μm. The size of the large grains may reach 60 μm.

EXAMPLE 4A (Comparison)

Figure 10:
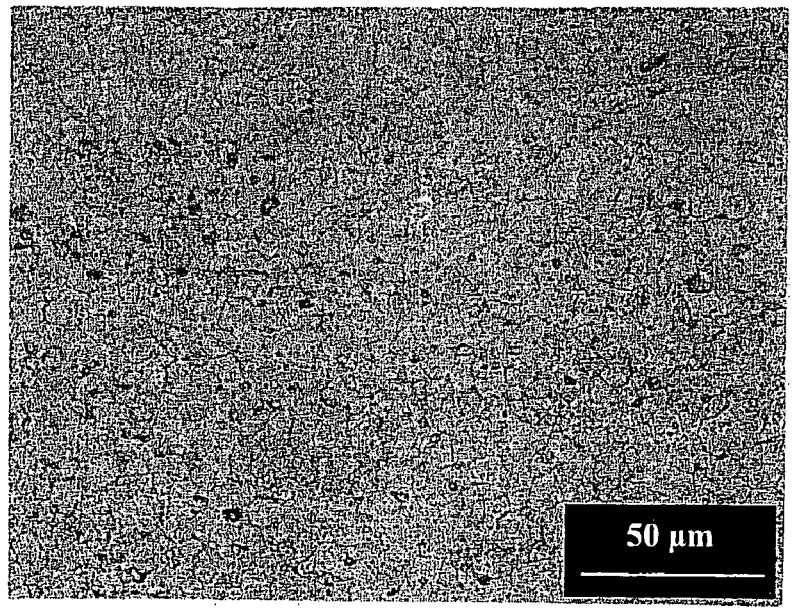
FIG. 10 is a microstructural observation, or micrograph, of a sintered pellet from a mixture of $UO_2$ and $PuO_2$ without sulphur. The line shown represents 50 µm.

By way of comparison, the pellets of the mixture ($UO_2$+$PuO_2$) that has not been subjected to mixing with UOS lead to the microstructure shown in FIG. 10. The average measured grain size is 6 μm.

The sintered pellets have a density of around 96% of the theoretical density (11.01).

The invention claimed is:

1. A sulfidation method for a $UO_2$ powder comprising sulfurating the $UO_2$ powder by bringing the powder into contact with a gaseous sulfidation agent at a temperature from 800° C. to 1200° C. wherein the sulfidation agent comprises 2.5% to 25% of $H_2S$, from 37.5% to 72.5% of hydrogen, and from 60% to 2.5% of inert gas, and the sulfidation is carried out for a period of time of 1 to 11 hours.

2. The method according to claim 1, wherein the inert gas is argon or nitrogen.

3. The method acc6rding to claim 1, wherein the gaseous sulfidation agent with hydrogen and/or the inert gas has a total gas flow rate from 1 to 500 ml/mm.

4. The method according to claim 3, wherein the gaseous mixture has a total gas flow rate of 200 ml/mm.

5. The method according to claim 1, wherein the sulfurating is carried out at a temperature from 970° C. to 980° C. for a period of time from 1 to 11 hours.

6. A method for manufacturing nuclear fuel pellets based on uranium oxide, or mixed oxide of uranium and plutonium, from a load of totally or partially sulfurated $UO_2$ powder or mixture of $UO_2$ powder and $PuO_2$ powder, the method comprising:

(a) sulfurating a $UO_2$ powder by bringing the powder into contact with a gaseous sulfidation agent comprising $H_2S$, hydrogen and inert gas;

(b) optionally mixing the sulfurated powder in a matrix comprising a $UO_2$ powder or comprising a $UO_2$ powder and a $PuO_2$ powder; and (c) subjecting the load of the sulfurated powder or of the mixture of the sulfurated powder and the matrix to lubrication, pelletizing and sintering operations, wherein the level of sulfur in the load subjected to the lubrication, pelletizing and sintering operations is from 50 ppm to 1%.

7. The method according to claim 6, wherein the silfurated powder is incorporated in the matrix by simple mixing.

8. The method according to claim 6, wherein the level of sulfur in the load subjected to the lubrication, pelletizing and sintering operations is fiom 100 ppm to 1000 ppm.

9. The method according to claim 6, wherein all or part of the matrix subjected to the lubrication, pelletizing and sintering operations is subjected, prior to the lubrication operation, to a grinding operation.

10. The method according to claim 9, wherein the grinding operation is performed in a ball mill.

11. The method according to claim 6, wherein all or part of the $UO_2$ powder in the load is a powder that has been subjected, prior to grinding, to a reducing treatment such that the powder has an O/U atomic ratio of 2.00 to 2.04.

12. The method according to claim 6, wherein a pore forming agent is incorporated in the load during lubrication.

13. The method according to claim 6, wherein the pelletizing operation is canied out using a hydraulic press.

14. The method according to claim 6, wherein the sintering operation is carried out at a temperature between 1650° C. and 1750° C. in a hydrogenated atmosphere.

15. The method according to claim 14, wherein the sintering operation is carried out at a temperature of 1700° C. in a hydrogenated atmosphere.

16. The method according to claim 14, wherein the atmosphere is humidified.

17. The method according to claim 6, wherein the pellets produced are subjected to dry precision grinding.

* * * * *

UNITED STATES PATENT AND TRADEMARK OFFICE
CERTIFICATE OF CORRECTION

| | |
|---|---|
| PATENT NO. | : 7,309,473 B2 |
| APPLICATION NO. | : 10/482541 |
| DATED | : December 18, 2007 |
| INVENTOR(S) | : Laurent Caranoni and Sylvie Dubois |

It is certified that error appears in the above-identified patent and that said Letters Patent is hereby corrected as shown below:

ON THE COVER PAGE:

The first Assignee should be changed from "Commissariat a l'Energic Atomique" to read --Commissariat A l'Energie Atomique--.

The second Assignee should be changed from "Compagnic Generale des Matieres Nucleaires" to read --Compagnie Generale des Matieres Nucleaires--.

IN THE CLAIMS:

Column 12, Line 40: "acc6rding" should be corrected to read --according--.

Column 12, Line 42: "500 ml/mm" should be corrected to read --500 ml/min.--.

Column 12, Line 44: "200 ml/mm" should be corrected to read --200 ml/min.--.

Column 12, Line 66: "silfurated" should be corrected to read --sulfurated--.

Signed and Sealed this

Twelfth Day of August, 2008

JON W. DUDAS
*Director of the United States Patent and Trademark Office*